United States Patent [19]

Vollert

[11] Patent Number: 4,578,686

[45] Date of Patent: Mar. 25, 1986

[54] INK PRINTHEAD

[75] Inventor: Emmeran Vollert, Grosshoehenrain, Fed. Rep. of Germany

[73] Assignee: Siemens Aktiengesellschaft, Berlin & Munich, Fed. Rep. of Germany

[21] Appl. No.: 696,206

[22] Filed: Jan. 29, 1985

[30] Foreign Application Priority Data

Feb. 2, 1984 [DE] Fed. Rep. of Germany ....... 3403615

[51] Int. Cl.[4] .............................................. G01D 15/18

[52] U.S. Cl. .................................... 346/140 R; 346/75

[58] Field of Search .............................. 346/75, 140 R

[56] References Cited

U.S. PATENT DOCUMENTS 4,385,304 5/1983 Sniderman ...................... 346/140 R 4,390,886 6/1983 Sultan ............................ 346/140 R 4,392,145 7/1983 Parkola .......................... 346/140 R

*Primary Examiner*—E. A. Goldberg

*Assistant Examiner*—Gerald E. Preston

*Attorney, Agent, or Firm*—Hill, Van Santen, Steadman & Simpson

[57] ABSTRACT

A writing head for an ink printing device characterized by piezo-electric drive elements being formed by piezo-electrical laminae having cut edges shaped to produce a discharge opening in communication with an ink chamber which is separated from an ink supply channel by a choke channel. The laminae are arranged with spacer elements in a stacked arrangement to form the writing head with a plurality of discharge openings which can individually discharge droplets of ink.

16 Claims, 8 Drawing Figures

INK PRINTHEAD

BACKGROUND OF THE INVENTION

The present invention is directed to a writing head for an ink printing device comprising piezo-electric drive elements having a shape which changes due to suitable polarized drive pulses and under whose influence ink is sucked out of an ink reservoir through a common ink feed channel during an expansion phase and a small volume of ink is ejected in the form of an ink droplet during a following contraction phase.

The essential functioning principle of an ink printing device is based on the fact that a drop-by-drop ink ejection from an ejection nozzle occurs under the influence of a transducer element, preferably a piezo-electric transducer drive element. As known, piezo-electric drive elements, ink channels with the discharge openings, and the feeds for the ink from a supply system are combined in so-called writing heads. In a known writing head, the drive elements have the form of a small piezo-electric tube, which embraces or surrounds the ink channel over part of its length. Given suitable drive of the small piezo-electric tube, the geometric dimensions thereof are changed and a pressure or shock wave is produced on the inside of the ink channel. This shock wave will cause a small drop of ink to be ejected from the discharge opening of the ink channel and it is noted that this discharge opening lies opposite the recording medium. The individual drive of the multitude of such drive elements disposed in a writing head creates the possibility of representing characters constructed matrix-like in an arbitrary shape.

Writing heads constructed in such a fashion have proven themselves very well in practice. There are problems, however, which occur in view of the manufacture of such writing heads. These problems essentially consist in the fact that the individual ink channels and the small piezo-electric tubes surrounding them must respectively be very exactly assembled, adjusted and cast out or encapsulated. The cost for manufacturing connected with these steps is considerable. It even increases when the spacing at the end of the writing head lying opposite a recording medium must be made very narrow in order, for example, to increase the number of discharge openings. Since according to the prior art, the ink channels are respectively terminated by a nozzle plate whose openings have a smaller diameter than the diameter of the ink channel, a limit is encountered for technological reasons.

In order, among other things, to reduce these problems, it has been disclosed to employ a so-called piezo-comb as a drive element. In this case, the drive element is composed of piezo-ceramic material shaped comb-like whose teeth are respectively disposed in front of the discharge opening. When driven, the teeth of the piezo-comb act like a flexure resonator so that they move quickly in a direction toward the discharge opening allocated to them and thus effect an ejection of a droplet. The problem connected with the writing head constructed in such a fashion essentially in that special measures for attenuating and limiting the cross-talk influences must be provided. These have a disturbing effect particularly during operation of such a writing head.

SUMMARY OF THE INVENTION

The object of the present invention is to provide a writing head for an ink printing device which can be manufactured without significant cost, which enables a very tight division of the discharge openings and a very high number of discharge openings without employing a nozzle plate, which guarantee a reliable functioning given droplet ejections, and which operate with a low drive voltage.

To accomplish these goals, the present invention is directed to an improvement in a writing head for an ink printing device comprising piezo-electric drive elements which have a shape which changes due to the suitable polarized drive pulses and under whose influence ink is sucked out of an ink reservoir through a shared or common ink feed channel during an expansion phase and a small volume of ink is ejected in the form of an ink droplet during a following contraction phase. The improvements are that each of the piezo-electric drive elements includes at least one piezo-lamina or plate which is contacted at both sides. Each of the piezo-lamina has a cut edge forming a recess with another edge to form an ink discharge opening in an upper region of the lamina, an ink chamber in a centrally expanded region, a choke channel in a constricted region which separates an ink feeding opening in the lower region from the ink chamber. The lamina are arranged in a sandwich arrangement stack or packet with spacing or spacer elements which are provided with openings that are positioned in alignment with the ink feed opening of the laminae to form an ink feed chamber or channel and this packet of alternate laminae and spacer elements is received in a shared or common block.

One of the significant advantages of the writing head of the invention is the reduction of the manufacturing cost because of the formation of the ink channel, ink chamber, drive and choke regions which previously required a number of successive work operations are now achieved by means of shaping of the piezo-electric plate. Another advantage is the low drive voltages are necessary for driving of the piezo-electric drive elements.

Other advantages are that the recess can be in each of the single plates and have a curved surface, that the recess can be formed by placing two plates in edge-to-edge relationship with the surfaces being shaped to form the narrow choke region, and discharge opening with the larger ink feed region and ink chamber. In one embodiment, only one edge of the piezo-electric plate is utilized and is positioned adjacent an edge of the housing to form the various discharge openings, in chambers, restrictions and ink channels.

Other features of the device are that the housing block can be mounted with a protective covering so that only the discharge openings are exposed to the outside and a means for collecting excess ink can be disposed around the writing head. Spacing elements can be made of a plastic material, which can be either insulating and/or conductive and if conductive and insulating, they are arranged in alternate layers. In addition, alternate spacer elements can be of plastic non-conductive spacers which are arranged with metal conductive spacers therebetween. In one embodiment, each of the spacers is formed of two layers with one being a plastic or synthetic layer and the other being a metal layer. In addition, the head may be provided with means for heating the ink to improve its ejection. To prevent penetration of the ink into the piezo-electric material, the edges of the plates or laminae forming the various ink channels and chamber may be provided with an insulating or protective coating.

Other advantages will be discussed hereinbelow and are shown in the drawings.

DESCRIPTION OF THE PREFERRED EMBODIMENTS

Figure 1:
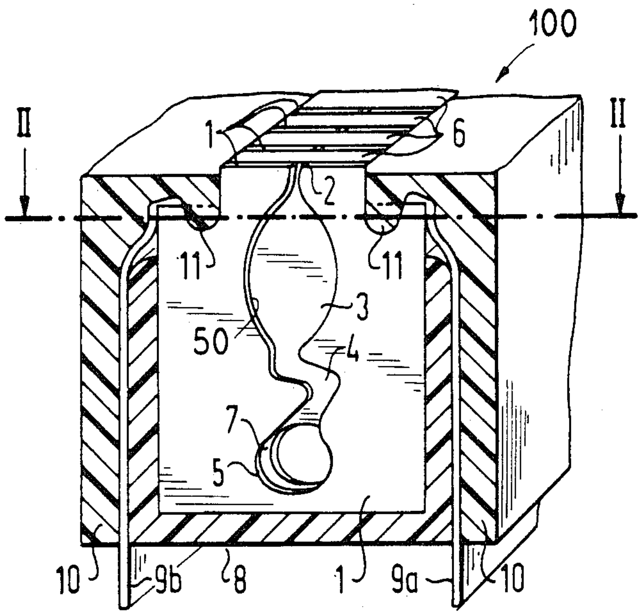
FIG. 1 is a perspective view in partial cross-section of an embodiment of the writing head in accordance with the present invention.

The principles of the present invention are particularly useful when incorporated in a writing head generally indicated at 100 in FIG. 1. The writing head 100 is composed of a plurality of piezo-laminae or plates 1, which are arranged and separated by a plurality of distancers or spacing elements 6 as illustrated. Each of the piezo-laminae 1 have a recess or slot extending in from one side and the slot has curved edges 50 of various spacings therebetween to form a drive element for droplet ejection. As illustrated, the upper region of the slot adjacent an upper surface are closely spaced together to form a discharge opening 2. Immediately below the discharge opening 2, the recess or slot is expanded into a larger central ink chamber 3 which is separated by a constriction 4 from an ink channel portion 5. The constriction 4 acts as a choke to restrict flow of ink from the ink chamber 3 to the channel 5 during constriction or contracting of the laminae. The ink feed 5, which is illustrated as having basically a circular configuration, is also arranged in alignment with circular openings 7 in the spacer elements 6 and form an ink channel which is connected to a supply of ink. The stack of laminae and spacer elements are held in a common or shared block 8. The number of piezo elements or laminae 1 and thus the number of discharge openings 2 of the writing head can be adapted to the requirements that have recently been made on writing heads. For example, 32 or 48 discharge nozzles are possible without the outside dimensions of the writing head exceeding a standard dimension.

Two foils 9*a* and 9*b* with conductive leads are provided for contacting the piezo-laminae. The piezo-laminae 1 are dipsoldered to the leads of these foils at the corner as illustrated by the solder portions 12 (see FIG. 2). The stack of laminae and elements in the common block 8 can be surrounded by a cover 10 which is designed in accordance with the desired external shape for the writing head 100. Both the common block 8 as well as the outer cover 10 are advantageously made of a synthetic material. In the example, the cover 10 has nose-like projections 11 which are engaged in recesses in the plate 1 and elements 6 to assure that the nozzle opening dimensions are maintained.

Figure 2:
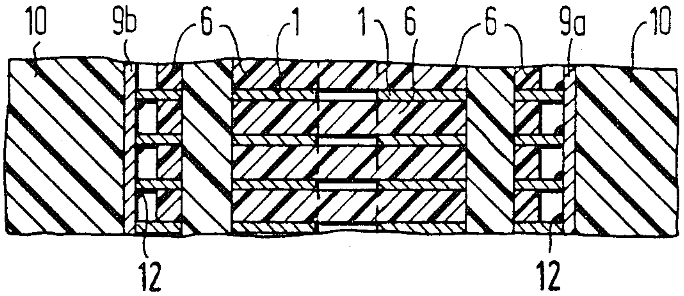
FIG. 2 is a cross-sectional view taken along the lines II—II of FIG. 1.

As best illustrated in FIG. 2, each of the piezo-laminae 1 projects laterally beyond the edges of the spacer elements 6. This enables the individual contacting of each plate or laminae 1 to the appropriate electrical leads which may be individual or may be carried on foils 9*a* and 9*b*. The connection can be made in a simple fashion. It may be seen in FIG. 2 that one side of the piezo-laminae is contacted via the leads on a left-handed foil 9*b* and the other side of the piezo-laminae is contacted via the leads on a right-handed foil 9*a*.

The manner of the operation of the writing head shown in FIGS. 1 and 2 is as follows. Given a corresponding drive of a piezo-laminae 1 via the terminals or foils 9*a* and 9*b*, either an expansion or contraction of the region defined by the recesses occur depending on the polarization direction of the piezo-electric material and the plurality of the drive pulses. In particular, the changes in shape of the piezo-electric material take effect in the region of the ink chamber 3. In detail, a droplet ejection will occur in the following way. Proceeding from an idle condition during which the discharge opening 2 is either entirely or nearly closed, the expansion phase is initiated with a drive pulse having a corresponding polarity and the regions 2, 3, 4 and 5 therefore expand. An inwardly arced meniscus is thereby formed in the discharge region 2 and a resupplying of the ink is initiated via the ink feed channel in the region 5. At the end of the drive pulse or at the reversal of its polarity, a contraction phase is initiated and a small volume of ink is thereby ejected toward the outside via the discharge opening 2 so that separation of the volume of ink is promoted at the same time by the increasing constriction of the discharge opening. The volume of ink thus separated quickly assumes a spherical shape and flies away as a small droplet.

The change in the thickness of the piezo-electric lamina 1 which occurs with the change of shape in the piezo-electric lamina is thereby entirely largely absorbed by the elasticity of the distance or spacing elements 6. The intake event during the expansion phase and the expulsion event during the contraction phase are thereby promoted. Since the arrangement only has very short paths, particularly since there are no long ink channels, no additional flow resistances will occur. Thus, the device can be operated with a noticeably lower drive voltage.

Figure 3:
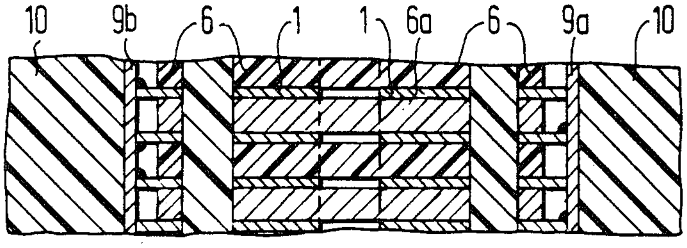
FIG. 3 is a cross-sectional view similar to that of FIG. 2 showing an embodiment of the arrangement of the spacing elements.

While the spacing elements illustrated in FIG. 2 and the embodiment of FIG. 1 were made of an elastic, non-conductive material such as a plastic material, it is possible to utilize spacing elements which are in an alternate arrangement which consist of hard, conductive material and elastic, non-conductive material. As illustrated in FIG. 3, the piezo-electric laminae 1 are respectively separated by the non-conductive spacing element 6 and by conductive spacing elements 6*a*. The respective contact surfaces of the two piezo-electric laminae are driven in common via the conductive distance element 6*a*. In the example, this occurs via the conductive foil 9*a*. The respective other contact surface of the piezo-electric laminae is contacted via the second conductive foil 9*b*, for example. This, however, presumes that the successive piezo-electric laminae 1 in this case respectively have polarization directions that are rotated by 180°. The conductive spacing elements 6*a* which, for example, are metal laminae, also serve for thermal conduction for keeping the ink temperature constant. The contacting cost is thus reduced by this arrangement.

Figure 4:
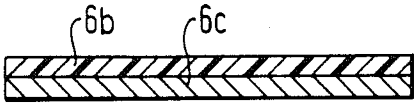
FIG. 4 is a cross-sectional view of another modification of one of the spacer elements.

According to one development, each of the spacing elements may be constructed in a sandwich-like manner. As illustrated in FIG. 4, a conductive metal strip 6*c* of the spacing element simultaneously serves as a pressure-wave-inhibiting material for contacting and as a heat-transmitter. The non-conductive material 6*b* of the element serves for absorbing the pressure wave. A noticeable reduction of cross-talk is obtained with this particular structure.

Figure 5:
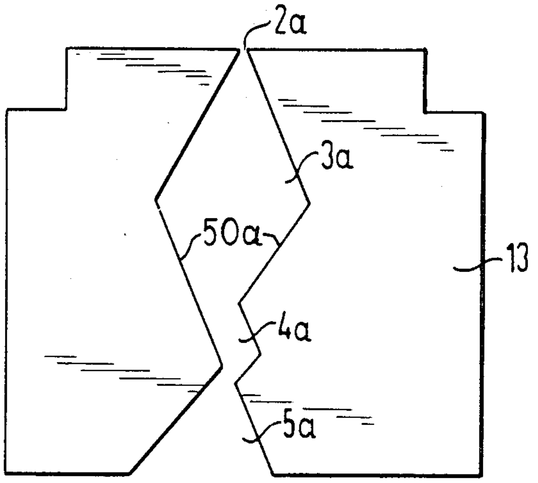
FIG. 5 is a plan view of an embodiment of the shaping of the piezo-electric laminae.
Figure 6:
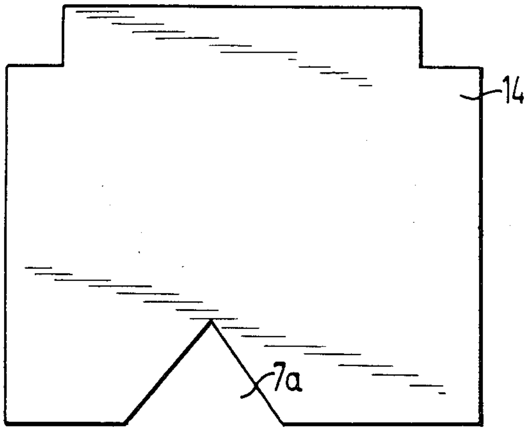
FIG. 6 is a plan view of a modification of a spacer element.

In an embodiment of the invention, the recesses of the piezo-electric laminae comprise cut edges which extend in a straight line. FIG. 5 illustrates an example of such an embodiment. In particular, piezo-electric lamina or plate 13 is cut in two by cut edges 50*a* which have straight extending segments which are arranged in a pattern so as to form a discharge opening 2*a,* an ink chamber 3*a,* a choke region 4*a* which separates the ink chamber 3*a* from an ink channel 5*a.* As illustrated in FIG. 6, a spacer element 14 has a corresponding notch 7*a* which is aligned with the ink channel 5*a* to form a continuous ink channel which is common to each of the plates when the plates and elements 14 are arranged in a stack. An advantage of the structure of the plate illustrated in FIG. 5 and the spacers of FIG. 6 are that they permit manufacturing in an automatic cutting operation.

According to another development of the invention, it is proposed that the piezo-electric plate or lamina be provided as a piezo drive element, the recesses given such a piezo plate being disposed on only one side wherein the regions forming the discharge opening, the ink chamber, the choke channel and the ink feed channel are formed and bounded by the recesses of the piezo-electric plate on the one hand and on the other hand by a lateral wall of the shared block or outer covering.

Figure 7:
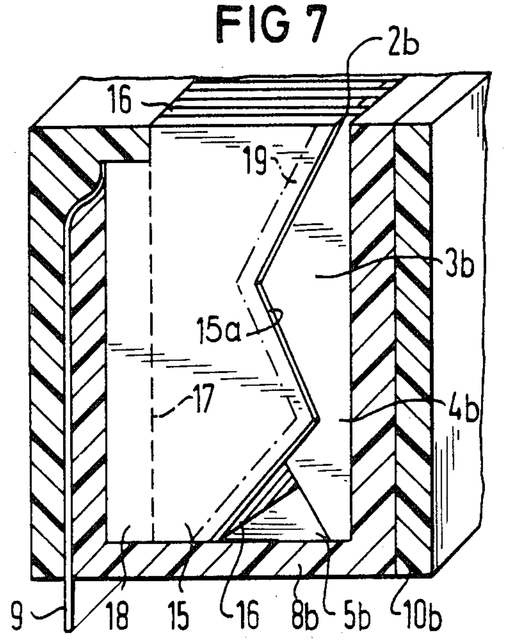
FIG. 7 is a perspective view of a writing head utilizing another modification of the structure of the piezo-electric laminae in accordance with the present invention in a writing head.

An illustrative embodiment of this development is shown in FIG. 7 wherein a piezo plate 15 has a cut edge 15*a* formed of several straight line segments. The cut edge 15*a* coacts with a portion of the wall of a common block 8*b* to form a discharge opening 2*b,* the ink chamber 3*b,* a choke channel 4*b* and an ink feed channel 5*b.* Plate-shaped spacer elements 16 likewise have recesses having straight edges which are aligned with a portion of the channel 5*b* to form a common interconnected channel between the various piezo-electric plates or laminae 15. An advantage connected with this embodiment is that there is a reduction in the piezo-electric material needed and that the production of the piezo-electric plates or laminae shaped in such a manner can be carried out with less cost.

When the piezo-laminae 15 and the elements 16 are rigidly connected to one another at one side, then the change in the shape of the piezo-laminae which is the determining factor in the droplet ejection largely acts only on the regions of the discharge opening 2*b,* the ink chamber 3*b,* the choke channel 4*b* and the feed channel 5*b.* In FIG. 7, such a connection is indicated by a region 18 which is bounded by a broken line 17. In the example, the piezo-lamina 15 and the spacer elements 16 are connected in a region 18 by means of bonding. Due to this bonding, deformation of the piezo-lamina 15 due to corresponding drive pulses largely occurs only in the ink regions 3*c,* 4*c* and 5*c.*

In the previously described embodiments, the piezo-lamina are contacted at both sides such as illustrated in FIG. 1. In order to avoid direct contact between these contact layers and the ink fluid, it is proposed that an insulating coating be applied to the piezo-laminae in the region of the interior filled with the ink. As illustrated in the embodiment of FIG. 7, an insulating coating 19 which is indicated by the dot-dash line, is applied to the piezo-lamina 15 along the cut edge 15*a* which edge forms the various regions 2*b,* 3*b,* 4*b* and 5*b.* Such an insulating coating can also be provided in a similar fashion on the piezo-laminae shaped in accordance with the embodiments previously described and illustrated in FIGS. 1 and 5.

Figure 8:
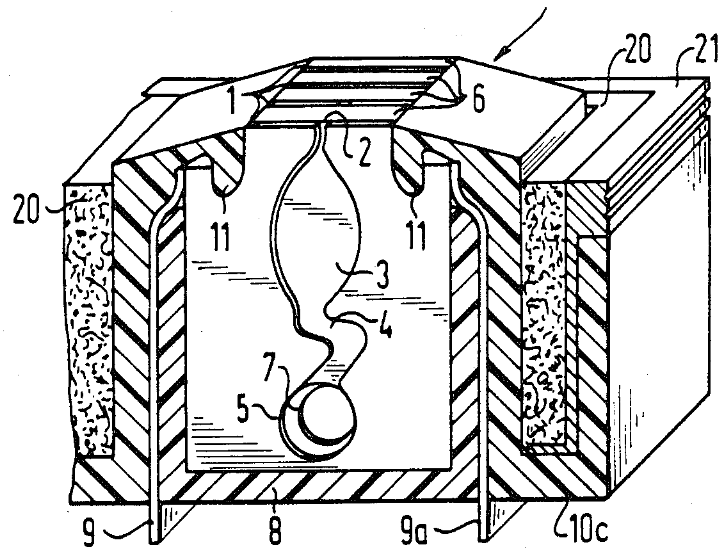
FIG. 8 is another perspective view similar to FIG. 1 with a further modification of the writing head in accordance with the present invention.

An embodiment of the writing head is illustrated at 100*a* in FIG. 8. The writing head 100*a* is distinguished from the writing head 100 in that it is equipped with an additional device for the acceptance of waste or excess ink. The example shown in FIG. 8 shows the writing head 100*c* as already described with reference to the writing head 100 of FIG. 1. In this case, the cover 10*c* is somewhat expanded and has a recess, for example, for a felt ring 20. The felt ring 20 is preferably secured in the recess by a mounting ring 21 which can be manually replaced as needed. In this case, the upper surface of the cover can be slanted somewhat toward the felt ring 20. The structure illustrated in FIG. 8 offers a particular advantage that the writing head is equipped with a combined cleaning, rinsing and sealing means.

According to a further embodiment of the invention, the writing head of the invention can also have means for heating the ink in the region of the discharge opening or respectively for heating the ink in the entire writing head. In a manner known per se, the ink heating can also be obtained by a heating plate or heating coil being inserted in the common block 8. Temperature-sensing equipment can be disposed in the region of the discharge opening preferably at both sides of the discharge openings.

Since the individual work steps required for manufacturing the writing heads 100 and 100*c* can be easily automated, the writing head is suited for mass production which is a particular advantage. The employment of a separate nozzle plate disposed in front of the discharge opening of the ink channels is also eliminated so that there are also clear savings with respect to parts cost. In addition, the problem connected with the manufacturing of nozzle openings that are very small and lie extremely close together when encapsulated with a resin are also eliminated.

Although various minor modifications may be suggested by those versed in the art, it should be understood that I wish to embody within the scope of the patent granted hereon, all such modifications as reasonably and properly come within the scope of my contribution to the art.

I claim:

1. In a writing head for an ink-printing device comprising piezo-electric drive elements which have a shape which changes due to suitable polarized drive pulses and under whose influence ink is sucked out of an ink reservoir through a common ink feed channel during an expansion phase and a small volume of ink is ejected in the form of a ink droplet during a following contraction phase, the improvements comprising each of the piezo-electric drive elements including at least one piezo-electric lamina with appropriate electrical connections, each of the laminae having a cut edge forming a recess with another edge to form an ink discharge opening in an upper region of the lamina, an ink chamber in a central expanded region, a choke channel in a constricted region separating an ink feeding opening in the lower region from the ink chamber; spacer elements having an opening therein, said spacer elements and laminae being arranged in a stack with a spacer element on each side of each laminae and the openings of the spacer elements being aligned with the ink feeding openings of the laminae to form an ink feed channel; and a common block receiving the stack of alternate laminae and spacer elements.

2. In a writing head according to claim 1, wherein each of the piezo-electric drive elements consist of a single piezo-lamina, said cut edge being a cut edge formed by a slot extending inward from one edge of the lamina, said slot having curved edges, and the opening in each of the spacer elements having curved edges.

3. In a writing head according to claim 1, wherein each of the piezo-electric drive elements is formed by a pair of piezo-laminae having cut edges facing each other, each of the cut edges having straight line segments spaced from each other to form the discharge opening, the ink chamber, the choke channel and the ink feeding opening and the openings in each of the spacer elements having straight line portions.

4. In a writing head according to claim 3, wherein the ink feeding opening of the piezo-electric drive and the openings of each of the spacer elements are arranged at an edge and coact with a portion of the common block to form the ink channel.

5. In a writing head according to claim 1, wherein each of the piezo-electric drive elements is formed by a single piezo-lamina with the cut edge being along one side thereof and coacting with a wall surface of the common block to form the discharge opening, ink chamber, choke channel and ink feed opening.

6. In a writing head according to claim 5, wherein the edge of each of the laminae is formed with straight line segments.

7. In a writing head according to claim 5, wherein each of the piezo-laminae and associated spacer elements are connected to one another along an edge opposite the cut edge of the lamina.

8. In a writing head according to claim 1, wherein each of the piezo-laminae are provided with an insulating coating along a sub-range forming the surface along the cut edge thereof.

9. In a writing head according to claim 1, wherein the discharge opening of each of the piezo-electric drives while in an idle condition has a definite cross-section, said definite cross-section expanding during an expansion phase and constricting during the contracting phase.

10. In a writing head according to claim 1, wherein the discharge opening of each of the piezo-electric drives is substantially closed while in the idle condition of the piezo-electric drive, said discharge opening expanding to an open position during an expansion phase and contracting back to a closed position during the contraction phase.

11. In a writing head according to claim 10, wherein the spacer elements and the piezo-electric laminae are connected to one another along one side which is spaced from the cut edge forming the opening, ink chamber, choke channel and discharge opening.

12. In a writing head according to claim 1, wherein each of the spacer elements is composed of a non-conductive material and wherein each of the laminae has a portion extending past the spacer element to enable forming an electrical contact with a lead carried on a foil.

13. In a writing head according to claim 1, wherein alternate spacer elements consist of non-conductive elastic material with the other spacer elements being of a conductive, non-elastic material, each of the spacer elements of conductive, non-elastic material being connected to an electrical field and forming a connection with the laminae engaged therewith, each of the laminae having a second conductive contact being formed with an electrical lead on a foil with the adjacent laminae being oppositely polarized.

14. In a writing head according to claim 1, wherein each of the spacer elements consist of two layers, one layer being a non-conductive, elastic material and the other layer being a conductive non-elastic material, said conductive layer forming an electrical contact for the adjacent lamina, the other contact for the laminae being formed by a connection to a lead carried by a foil adjacent an edge thereof.

15. In a writing head according to claim 1, which includes a cover coacting with the block to cover the entire stack except for the portion of the discharge opening.

16. In a writing head according to claim 15, wherein said cover has means for accepting waste ink, said means including a groove in the cover surrounding the discharge opening receiving an absorbent insert.

* * * * *